(12) United States Patent
Wang et al.

(10) Patent No.: US 12,549,470 B2
(45) Date of Patent: Feb. 10, 2026

(54) MESSAGE SENDING METHOD, MESSAGE PROCESSING METHOD, APPARATUS, AND SYSTEM

(71) Applicant: Huawei Technologies Co., Ltd., Shenzhen (CN)

(72) Inventors: Haibo Wang, Beijing (CN); Shunwan Zhuang, Beijing (CN); Gang Yan, Beijing (CN)

(73) Assignee: HUAWEI TECHNOLOIGES CO., LTD., Shenzhen (CN)

( * ) Notice: Subject to any disclaimer, the term of this patent is extended or adjusted under 35 U.S.C. 154(b) by 351 days.

(21) Appl. No.: 18/324,427

(22) Filed: May 26, 2023

(65) Prior Publication Data

US 2023/0308383 A1    Sep. 28, 2023

Related U.S. Application Data

(63) Continuation of application No. PCT/CN2021/133344, filed on Nov. 26, 2021.

(30) Foreign Application Priority Data

Nov. 27, 2020    (CN) .......................... 202011359511.4

(51) Int. Cl.
*H04L 45/02* (2022.01)
(52) U.S. Cl.
CPC .................................... *H04L 45/04* (2013.01)
(58) Field of Classification Search
CPC ........ H04L 45/04; H04L 45/02; H04L 45/033
See application file for complete search history.

(56) References Cited

U.S. PATENT DOCUMENTS

| | | | |
|---|---|---|---|
| 2005/0283527 A1 | 12/2005 | Corrado et al. | |
| 2007/0140251 A1* | 6/2007 | Dong | H04L 63/0272 370/392 |
| 2007/0250902 A1* | 10/2007 | Vaidyanathan | H04L 45/04 726/1 |
| 2009/0274159 A1* | 11/2009 | Xia | H04L 45/04 370/401 |
| 2010/0284403 A1* | 11/2010 | Scudder | H04L 45/04 370/392 |

(Continued)

FOREIGN PATENT DOCUMENTS

| | | | | |
|---|---|---|---|---|
| CN | 116938809 A | * | 10/2023 | ............. H04L 45/02 |
| JP | 2023024483 A | * | 2/2023 | ............. H04L 45/02 |

(Continued)

OTHER PUBLICATIONS

Wang et al. WO 2020135190 A1 (translation, Date Published Jul. 2, 2020) (Year: 2020).*

(Continued)

*Primary Examiner* — Wutchung Chu
(74) *Attorney, Agent, or Firm* — Conley Rose, P.C.

(57) ABSTRACT

A message sending method includes a first network device that obtains an identifier of a first autonomous system (AS), where the first AS is adjacent to a second AS, and the first network device belongs to the second AS. The first network device sends a first message to a second network device, where the first message carries the identifier of the first AS, and the second network device belongs to the second AS or a third AS.

20 Claims, 4 Drawing Sheets

(56) References Cited

U.S. PATENT DOCUMENTS

| | | | |
|---|---|---|---|
| 2013/0097703 A1* | 4/2013 | Ji | H04L 63/1416 |
| | | | 726/22 |
| 2013/0132542 A1* | 5/2013 | Zhang | H04L 45/04 |
| | | | 709/223 |
| 2013/0246654 A1* | 9/2013 | Cicic | H04L 45/122 |
| | | | 709/238 |
| 2015/0341310 A1* | 11/2015 | You | H04L 61/5007 |
| | | | 709/245 |
| 2016/0134591 A1* | 5/2016 | Liao | H04L 45/04 |
| | | | 726/15 |
| 2017/0041333 A1* | 2/2017 | Mahjoub | H04L 43/0876 |
| 2020/0267074 A1* | 8/2020 | Wang | H04L 63/20 |
| 2021/0194918 A1* | 6/2021 | Earl | H04L 63/1466 |
| 2023/0308383 A1* | 9/2023 | Wang | H04L 45/033 |

FOREIGN PATENT DOCUMENTS

| | | | | |
|---|---|---|---|---|
| WO | WO-2020135190 A1 * | 7/2020 | | H04L 63/1466 |
| WO | 2020181881 A1 | 9/2020 | | |
| WO | WO-2022057107 A1 * | 3/2022 | | G05D 1/104 |

OTHER PUBLICATIONS

Internet Protocol Version 6 Address Space, https://www.iana.org/assignments/ipv6-address-space/ipv6-address-space.xhtml, Sep. 10, 2024, total 2 pages.

\* cited by examiner

MESSAGE SENDING METHOD, MESSAGE PROCESSING METHOD, APPARATUS, AND SYSTEM

CROSS-REFERENCE TO RELATED APPLICATIONS

This application is a continuation application of International Patent Application No. PCT/CN2021/133344 filed on Nov. 26, 2021, which claims priority to Chinese Patent Application No. 202011359511.4 filed on Nov. 27, 2020. The disclosures of the aforementioned applications are hereby incorporated by reference in their entireties.

TECHNICAL FIELD

This application relates to the communication field, and in particular, to a message sending method, a message processing method, an apparatus, and a system.

BACKGROUND

The Border Gateway Protocol (BGP) is a widely used network protocol. A BGP network architecture may include a plurality of network devices. The plurality of network devices may be classified into one or more autonomous systems (ASs). A border network device of any AS may be connected to a border network device of another AS. Data can be transmitted between different ASs through a connection between border network devices. Any two ASs connected via border network devices may be referred to as neighbor ASs, and a relationship between the neighbor ASs is an adjacent relationship.

A neighbor relationship between ASs indicates a connection relationship between ASs, and may be used for network security verification, for example, used for verifying an AS path. A neighbor relationship between ASs is mainly registered by an internet service provider (ISP). When a new AS is added to a network architecture, an ISP to which the AS belongs may upload a neighbor relationship between the AS and another AS in the network architecture to a database. Other ASs can obtain the neighbor relationship between ASs by accessing the database. However, in the conventional technology, because an ISP proactively uploads a neighbor relationship between ASs, and the uploaded neighbor relationship between ASs may be inconsistent with an actual neighbor relationship, efficiency is low.

SUMMARY

Embodiments of this application provide a message sending method, a message processing method, an apparatus, and a system, so that a network device automatically obtains a neighbor relationship between ASs without proactive reporting of an ISP.

According to a first aspect, an embodiment of this application provides a message sending method. The method may be applied to a first network device such as a router or a switch. The first network device belongs to a second AS. The method includes the following steps. First, a first network device obtains an identifier of a first AS. The first AS is adjacent to a second AS. The first network device may determine a neighbor relationship between the first AS and the second AS based on the identifier of the first AS. Then, the first network device may send a first message to a second network device. The first message carries the identifier of the first AS, and notifies the second network device that the first AS is adjacent to the second AS. The second network device may belong to the second AS or a third AS, and the third AS may be, for example, an AS adjacent to the second AS. When the second network device belongs to the second AS, that the first network device sends the first message to the second network device is equivalent to advertising the neighbor relationship between the first AS and the second AS between network devices inside the second AS. When the second network device belongs to the third AS, that the first network device sends the first message to the second network device is equivalent to advertising the neighbor relationship between the first AS and the second AS to another AS other than the second AS. In this way, the first network device may proactively collect a neighbor relationship between the second AS to which the first network device belongs and another AS, and advertise a neighbor relationship between the first AS and another AS to the network devices inside the second AS and/or network devices outside the second AS. In this way, a network device inside an AS may proactively collect a neighbor relationship between the AS in which the network device is located and another AS, and advertise the neighbor relationship to another network device. Compared with a conventional technology, an ISP does not need to proactively report a neighbor relationship between ASs, and a network device may obtain a neighbor relationship between a new AS and another AS when the new AS joins a network. In addition, problems of incorrect reporting and missing reporting do not occur, the neighbor relationship is obtained quickly, and reliability is high.

Optionally, the first network device may obtain the identifier of the first AS by using a second message or the neighbor relationship. The second message may be sent by a third network device to the first network device, and include the identifier of the first AS. The third network device may belong to the first AS or the second AS. When the third network device belongs to the first AS, the third network device may send the second message to the first network device through a connection between the first AS and the second AS, so that the first network device obtains the identifier of the first AS and learns that the first AS is adjacent to the second AS. When the third network device belongs to the second AS, the third network device may be a border network device of the second AS, and advertise the neighbor relationship between the first AS and the second AS to a first network device inside the second AS by using the second message. In addition, the first network device may alternatively obtain the identifier of the first AS based on the configured neighbor relationship between the first AS and the second AS.

Optionally, the first message sent by the first network device to the second network device may include business role information. The business role information reflects a business relationship between the first AS and the second AS. The second network device may learn the business relationship between the first AS and the second AS by using the first message.

Optionally, the first message may be a BGP update message. The foregoing second message may also be a BGP update message.

Optionally, when the first message is the BGP update message, the first message may include a network layer reachability information (NLRI) field and an attribute field. The identifier of the first AS may be carried in the NLRI field and/or the attribute field.

Optionally, the first message further includes an identifier of the first network device, for example, a router identifier (ID) of the first network device. The second network device may determine, based on the identifier of the first network device, a network device that sends the first message.

Optionally, when the first message is the BGP update message, the identifier of the first network device may be carried in the NLRI field of the first message.

Optionally, when the second network device belongs to the third AS, the first message further includes an identifier of the second AS. In this way, the second network device may determine the neighbor relationship between the first AS and the second AS based on the identifier of the first AS and the identifier of the second AS that are included in the first message.

Optionally, the first message may be used by the second network device to perform route verification based on the identifier of the first AS. The second network device may determine the neighbor relationship between the first AS and the second AS based on the identifier of the first AS, to perform verification on a neighbor relationship carried in another packet by using the neighbor relationship, or perform verification on the identifier of the first AS by using a neighbor relationship carried in another packet.

Optionally, the message sending method provided in this embodiment of this application may be applied to an Internet Protocol (IP)-based network. The IP network includes an IP version 4 (IPv4) or IP version 6 (IPv6) network.

According to a second aspect, an embodiment of this application provides a message processing method. The method may be applied to a first network device. The method includes the following steps. First, a first network device receives a first message from a second network device. The first message includes an identifier of a first AS and an identifier of a neighbor AS of the first AS, and indicates a neighbor relationship between the first AS and another AS. The neighbor AS of the first AS includes a second AS, and the first message may include an identifier of the second AS. Then, the first network device performs route verification based on the first message. In this way, after receiving the neighbor relationship between the first AS and the other AS, the first network device may perform verification on the neighbor relationship, to ensure reliability of the neighbor relationship.

Optionally, the first network device may further receive a second message from a third network device. The second message includes an identifier of a neighbor AS of the second AS, and indicates a neighbor relationship between the second AS and another AS. The first network device may determine whether the identifier of the neighbor AS of the second AS includes the identifier of the first AS. If the identifier of the neighbor AS of the second AS does not include the identifier of the first AS, the second message indicates that the first AS is not a neighbor of the second AS. The first message further indicates that the second AS is a neighbor of the first AS. In response to the identifier of the neighbor AS of the second AS not including the identifier of the first AS, the first network device may determine that the first message conflicts with the second message, to generate an alarm.

Optionally, the first message may include first business role information, and the first business role information reflects a business relationship between the first AS and the second AS. The first network device may perform verification on the business relationship between the first AS and the second AS based on the first business role information. The first network device may receive a second message from a third network device. The second message includes an identifier of a neighbor of the second AS and second business role information, the neighbor AS of the second AS includes the first AS, and the second business role information reflects a business relationship between the first AS and the second AS. The first network device may determine whether the first business role information matches the second business role information. If the first business role information does not match the second business role information, the first network device may generate an alarm.

According to a third aspect, an embodiment of this application provides a message sending apparatus. The apparatus may be used in a first network device, and includes a processing unit configured to obtain an identifier of a first AS, where the first AS is adjacent to a second AS, and the first network device belongs to the second AS, and a sending unit configured to send a first message to a second network device, where the first message carries the identifier of the first AS, and the second network device belongs to the second AS or a third AS.

Optionally, the processing unit is configured to receive a second message from a third network device. The second message includes the identifier of the first AS, and the third network device belongs to the first AS or the second AS. Alternatively, the processing unit is configured to obtain the identifier of the first AS based on a neighbor relationship. The neighbor relationship indicates an adjacent relationship between the first AS and the second AS.

Optionally, the first message further includes business role information, and the business role information reflects a business relationship between the first AS and the second AS.

Optionally, the first message is a BGP update message.

Optionally, the identifier of the first AS is carried in a network layer reachability information NLRI field or an attribute field of the BGP update message.

Optionally, the NLRI field includes indication information, and the indication information indicates that the BGP update message includes the identifier of the first AS.

Optionally, the first message is a BGP update message, and the business role information is carried in an attribute field of the BGP update message.

Optionally, the first message further includes an identifier of the first network device.

Optionally, the first message is the BGP update message, and the identifier of the first network device is carried in the NLRI field of the BGP update message.

Optionally, the second network device belongs to the third AS, and the first message further includes an identifier of the second AS.

Optionally, the first message is used by the second network device to perform route verification based on the identifier of the first AS.

Optionally, the apparatus is used in an IP-based network.

According to a fourth aspect, an embodiment of this application provides a message processing apparatus. The apparatus is used in a first network device, and includes a receiving unit configured to receive a first message from a second network device, where the first message includes an identifier of a first autonomous system AS and an identifier of a neighbor AS of the first AS, and the neighbor AS of the first AS includes a second AS, and a processing unit configured to perform route verification based on the first message.

Optionally, the receiving unit is further configured to receive a second message from a third network device. The second message includes an identifier of a neighbor AS of the second AS. The processing unit is further configured to generate an alarm in response to the identifier of the neighbor AS of the second AS not including the identifier of the first AS.

Optionally, the first message further includes first business role information, and the first business role information reflects a business relationship between the first AS and the second AS. The receiving unit is further configured to receive a second message from a third network device. The second message includes an identifier of a neighbor AS of the second AS and second business role information, the second business role information reflects a business relationship between the first AS and the second AS, and the neighbor AS of the second AS includes the first AS. The processing unit is further configured to generate an alarm in response to the first business role information not matching the second business role information.

According to a fifth aspect, an embodiment of this application provides a network system, including a first network device. The first network device may be configured to perform the message sending method according to the first aspect.

Optionally, the network further includes a second network device, and the second network device is configured to receive a first message sent by the first network device.

According to a sixth aspect, an embodiment of this application provides a network system, including a first network device. The first network device may be configured to perform the message processing method according to the second aspect.

Optionally, the network system further includes a second network device, and the second network device is configured to send a first message to the first network device.

According to a seventh aspect, an embodiment of this application further provides a network device. The network device includes at least one processor. The at least one processor is coupled to at least one memory. The at least one processor is configured to execute a computer program or instructions stored in the at least one memory, so that the network device performs the message sending method according to the first aspect.

According to an eighth aspect, an embodiment of this application further provides a network device. The network device includes at least one processor. The at least one processor is coupled to at least one memory. The at least one processor is configured to execute a computer program or instructions stored in the at least one memory, so that the network device performs the message processing method according to the second aspect.

According to a ninth aspect, an embodiment of this application provides a computer-readable storage medium, including a computer program. When the computer program is run on a computer, the computer is enabled to perform the message sending method according to the first aspect.

According to a ninth aspect, an embodiment of this application provides a computer-readable storage medium, including a computer program. When the computer program is run on a computer, the computer is enabled to perform the message sending method according to the first aspect or the message processing method according to the second aspect.

According to a tenth aspect, an embodiment of this application provides a chip, including a processor and an interface circuit. The interface circuit is configured to receive instructions and transmit the instructions to the processor. The processor is configured to perform the message sending method according to the first aspect or the message processing method according to the second aspect.

DESCRIPTION OF EMBODIMENTS

Figure 1:
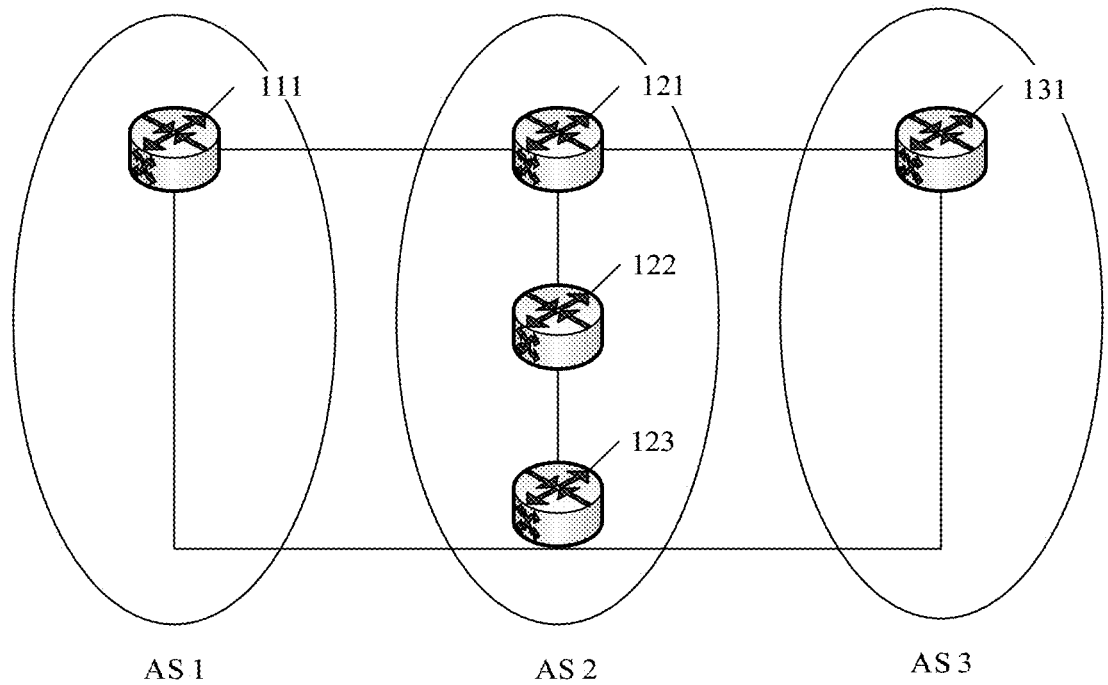
FIG. 1 is a schematic diagram of a network architecture of a system according to an embodiment of this application.

A BGP network architecture may include a plurality of ASs, and one AS may include a plurality of network devices. The network devices inside the AS may establish connections and transmit packets to each other. In addition, one or more network devices in one AS may be further connected to one or more network devices in another AS, to implement inter-AS packet transmission. These network devices connected to the network devices in the other AS are referred to as border network devices, any two ASs connected via border network devices are referred to as neighbor ASs, and an adjacent relationship between ASs is referred to as a neighbor relationship.

The neighbor relationship between ASs may be used for network security verification. For example, the network device may use the neighbor relationship between ASs to perform verification on an AS path. The AS path indicates that an AS through which a route passes in a forwarding process includes at least one AS identifier. Usually, each time a route advertisement message passes through one AS, an AS identifier corresponding to the AS is added to an AS path of the route advertisement message. By performing verification on adjacent AS identifiers in the AS path, it can be determined whether the route advertisement message is tampered with by an attacker. In other words, if a neighbor relationship between ASs in the AS path is inconsistent with an actual condition, it is considered that the route advertisement message is tampered with.

The neighbor relationship between ASs is proactively reported by an ISP. For example, when a new AS is added to a network, an ISP corresponding to the AS may upload a neighbor relationship between the AS and another AS in the network architecture to a database or a server. In this way, a network device in the other AS in the network architecture may download the neighbor relationship between the AS and the new AS from the database or the server, to perform network security verification by using the neighbor relationship.

Because the neighbor relationship between ASs needs to be proactively reported by the ISP, efficiency is low. In addition, if the ISP does not report the neighbor relationship or reports the neighbor relationship later, the neighbor relationship between ASs obtained by the network device in the AS may be inconsistent with an actual condition. In addition, when the ISP reports the neighbor relationship, problems of incorrect reporting and missing reporting may occur. Consequently, information reliability is poor.

To resolve the foregoing problems, embodiments of this application provide a message sending method and a message processing method. The method may be applied to a network using the IP, for example, a network system of an IPv6 or an IPv4, and may alternatively be applied to a network system using AS routing. In this method, a border network device of an AS may proactively collect a neighbor relationship between the AS and another AS, and send the neighbor relationship to a border network device in the other AS or a network device in the AS. In embodiments of this application, sending of a neighbor relationship by a border network device to a border network device in another AS may be referred to as an external advertisement, and sending of a neighbor relationship between network devices inside an AS may be referred to as an internal advertisement.

For ease of understanding, an application scenario in embodiments of this application is first described. FIG. 1 is a schematic diagram of an architecture of a system 100 according to an embodiment of this application.

The system may include a network device 111, a network device 121, a network device 122, a network device 123, and a network device 131. The network device 121 is separately connected to the network device 111 and the network device 131, the network device 122 is separately connected to the network device 121 and the network device 123, and the network device 131 is connected to the network device 111. The network device 111 belongs to an AS 1, the network device 121, the network device 122, and the network device 123 belong to an AS 2, and the network device 131 belongs to an AS 3.

The network device 111, the network device 121, the network device 122, the network device 123, and the network device 131 each may be an entity device such as a router, a switch, or a server having a routing function, or may be a virtual apparatus having a routing or switch function.

Figure 2:
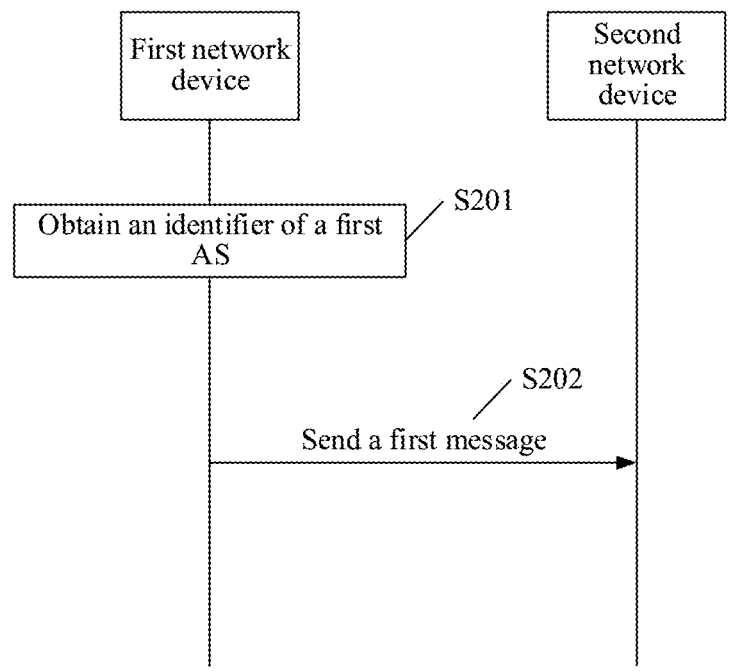
FIG. 2 is a diagram of signaling interaction of a message sending method according to an embodiment of this application.

FIG. 2 is a diagram of signaling interaction of a message sending method according to an embodiment of this application. The message sending method provided in this embodiment of this application includes the following steps.

S201: A first network device obtains an identifier of a first AS.

The first network device belongs to a second AS, and may be, for example, a border network device of the second AS. The second AS may be any autonomous system in a network architecture, and the first AS may be any autonomous system adjacent to the second AS in the network architecture, in other words, a neighbor relationship exists between the first AS and the second AS. For example, when the first network device is the network device 121 in FIG. 1, the second AS may be the AS 2, and the first AS may be the AS 1.

It should be noted that, in this embodiment of this application, a neighbor relationship between ASs may indicate that border network devices of two ASs are directly connected, or may indicate that border network devices of two ASs are connected via a router server (RS) in an internet exchange point (IXP). In other words, for the first AS and the second AS that are adjacent to each other, the border network device of the first AS may be directly connected to the border network device of the second AS, or may be connected to the RS in the IXP, and the RS is further connected to the border network device of the second AS.

In this embodiment of this application, there may be two possible implementations in which the first network device obtains the identifier of the first AS.

In the first possible implementation, the neighbor relationship between the first AS and the second AS may be configured in the first network device. Further, the neighbor relationship may be reflected as a correspondence between the identifier of the first AS and an identifier of the second AS.

In the second possible implementation, the first network device may receive a second message from a third network device, and the second message includes the identifier of the first AS. The first network device may learn, by using the second message, that the first AS is adjacent to the second AS. The third network device may belong to the first AS or the second AS. In other words, the first network device may receive a neighbor relationship from another network device in an internal advertisement manner, or in an external advertisement manner.

FIG. 1 is used as an example. If the first network device is the network device 221, the third network device may be the network device 211. The network device 211 may send, by using the second message, an identifier of an AS (namely, the AS 1) to which the network device 211 belongs to the border network device 221 in a neighbor AS of the network device 211, so that the network device 221 learns that the AS 1 is adjacent to the AS 2. In addition, when the first network device is the network device 222, the third network device may be the network device 221. The network device 221 may determine a neighbor relationship between the AS 1 and the AS 2, and send the second message to the network device 222, so that the network device 222 learns that the AS 1 is adjacent to the AS 2.

When the first network device and the third network device are connected via the RS in the IXP, the first network device may obtain the identifier of the first AS based on an AS path of the second message, and determine that the first AS is adjacent to the second AS. Further, the second message may be a route advertisement message. When generating the second message, the third network device may add an identifier of an AS (namely, the first AS) to which the third network device belongs to the AS path of the second message, and send the second message to the RS. After receiving the second message, the first network device identifies that the last AS identifier in the AS path is the identifier of the first AS. In this way, the first network device may determine that the first AS is adjacent to an AS, namely, the second AS, to which the first network device belongs.

In some possible implementations, the foregoing second message further includes business role information, and the business role information reflects a business relationship between the first AS and the second AS. Optionally, the business relationship may include three roles: a customer, a provider, and a peer, and indicate a service supply relationship between ASs. For example, it is assumed that the first AS is a customer and the second AS is a provider. In this way, the second AS may provide a service for the first AS. In some cases, the business relationship may also be referred to as a peering business relationship.

S202: The first network device sends a first message to a second network device.

After obtaining the identifier of the first AS, the first network device may send the first message to the second network device. The first message includes the identifier of the first AS, and notifies the second network device that the first AS is adjacent to the second AS.

In this embodiment of this application, the second network device may belong to the second AS or a third AS. The third AS may be any autonomous system different from the first AS and the second AS in the network architecture. Optionally, the third AS may be adjacent to the second AS. Based on different ASs to which the second network device belongs, application scenarios corresponding to sending of the first message by the first network device to the second network device are different, and the sent first messages are also different.

If the second network device belongs to the second AS, in other words, the first network device and the second network device belong to a same AS, that the first network device sends the first message to the second network device is advertising, inside the second AS, the neighbor relationship, to notify another network device in the second AS of the neighbor relationship between the first AS and the second AS. This corresponds to an application scenario of the foregoing internal advertisement. If the second network device belongs to the third AS, and the first network device and the second network device belong to different ASs, that the first network device sends the first message to the second network device is advertising, outside the second AS, the neighbor relationship, to notify another network device in another AS in a network of the neighbor relationship between the first AS and the second AS. This corresponds to an application scenario of the foregoing internal advertisement.

The following describes the two application scenarios separately.

In the application scenario of the internal advertisement, the first network device may be a border network device of the second AS, and is connected to the border network device (for example, the third network device) of the first AS. In this way, the third network device may determine the neighbor relationship between the first AS and the second AS and obtain the identifier of the first AS through the connection to the border network device of the first AS, and send the second message to the second network device to send the identifier of the first AS to the second network device. Certainly, the first network device may not be the border network device of the second AS. In this way, the first network device determines the neighbor relationship between the first AS and the second AS and obtains the identifier of the first AS by using a message (for example, the second message) sent by another border network device (for example, the third network device) in the second AS, and send the first message to the second network device to send the identifier of the first AS to the second network device. In the application scenario of the internal advertisement, the first message may include the identifier of the first AS, or may include an identifier that is of another AS adjacent to the second AS and that indicates a neighbor relationship between the second AS and the other AS.

FIG. 1 is still used as an example for description. It is assumed that the first network device is the network device 121, the second network device is the network device 122, the first AS is the AS 1, and the second AS is the AS 2. In this way, the network device 121 may receive the second message from the network device 111. The second message carries the identifier of the AS 1, indicating that the AS 1 is a neighbor AS of the AS 2. Then, the network device 121 may send the first message to the network device 122. The first message includes the identifier of the AS 1, and advertises the neighbor relationship between the AS 1 and the AS 2 to the network device 122. Certainly, in some possible implementations, the first network device may alternatively be the network device 122, and the second network device may be the network device 123. In this way, the network device 122 may receive the second message that is from the network device 121 and that carries the identifier of the AS 1, and send the first message that carries the identifier of the AS 1 to the network device 123, to notify the network device 123 that the AS 1 is adjacent to the AS 2.

The foregoing describes a method for sending the first message by the first network device to the second network device in the internal advertisement scenario. The following describes a method for sending the first message by the first network device to the second network device in the external advertisement scenario. Optionally, when the second network device belongs to the third AS, the first network device may send the first message to the second network device immediately after determining the neighbor relationship between the second AS and the first AS, or may send the first message to the second network device after determining neighbor relationships between the second AS and all other neighbor ASs. This is not limited in this embodiment of this application.

In an application scenario of the external advertisement, the first message includes the identifier of the first AS, and optionally, may further include the identifier of the second AS.

In some possible implementations, the first network device is the border network device of the second AS, and the second network device is a border network device of the third AS. In other words, the second AS is connected to the second network device in the third AS via the first network device. In this way, after receiving the second message from the third network device inside the second AS or the second message from the third network device in the first AS, the first network device sends the first message to the second network device.

FIG. 1 is still used as an example for description. It is assumed that the first network device is the network device 121, the second network device is the network device 131, the first AS is the AS 1, the second AS is the AS 2, and the third AS is the AS 3. In this way, the network device 121 may receive the second message that is from the network device 111 and that carries the identifier of the AS 1, and send the first message to the network device 131. The first message includes the identifier of the AS 1 and the identifier of the AS 2, and is used to advertise to the network device 131 the neighbor relationship between the AS 1 and the AS 2.

In some possible implementations, the first message further includes the business role information, and the business role information reflects the business relationship between the first AS and the second AS. For detailed descriptions of the business role information, refer to step S201. Details are not described herein again.

The foregoing describes the method for sending the first message by the first network device to the second network device, and the following describes a format of the first message.

In this embodiment of this application, the first message may be a special routing message, and carries a neighbor relationship between the second AS and another AS. In addition, the first message may alternatively be a unicast routing message or an AS routing message. When the first message is the unicast routing message, the first message may include routing information of the first network device and a neighbor relationship between the second AS and another AS. When the first message is the AS routing message, the first message may include routing information of the second AS (for example, the identifier of the second AS) and a neighbor relationship between the second AS and another AS.

Regardless of whether the first message is the special routing message, the unicast routing message, or the AS routing message, in this embodiment of this application, the first message may be a BGP update message. The BGP update message may include an NLRI field and/or an attribute field. In this embodiment of this application, the identifier of the first AS may be carried in the NLRI field and/or the attribute field.

The NLRI field may include a type field and a key field. When the identifier of the first AS is carried in the NLRI field, the identifier of the first AS may be carried in the key field of the NLRI field.

Optionally, the NLRI field of the first message may further carry indication information, and the indication information indicates that the BGP update message further includes the identifier of the first AS. In a possible implementation, the indication information is carried in the type field of the NLRI field.

In the internal advertisement scenario, the indication information further indicates that the first message is an internal advertisement message. In addition to the identifier of the first AS, the key field may further include an identifier of the first network device, for example, a router ID of the first network device.

In the external advertisement scenario, the indication information further indicates that the first message is an external advertisement message. Optionally, the NLRI field of the BGP update message may carry the identifier of the second AS, indicating that the advertisement message advertises a neighbor AS of the second AS. When the second AS includes another neighbor AS in addition to the first AS, the first message further includes an identifier of the other AS in addition to the identifier of the first AS. In this way, the identifiers of these ASs may all be carried in the attribute field of the BGP update message. The attribute field may include an AS relation field, and the identifier of the first AS and the identifier of the other AS may be carried in the AS relation field.

Regardless of the internal advertisement scenario or the external advertisement scenario, if the first message further includes the business role information indicating the business relationship between the first AS and the second AS, the business role information may be carried in the attribute field of the BGP update message. If the first message further carries business role information indicating a business relationship between the second AS and another AS, a correspondence between the business role information and an identifier of the other AS may also be carried in the attribute field of the BGP update message.

For example, refer to Table 1. The table is a possible format of the BGP update message used for the internal advertisement.

TABLE 1

| NLRI | Type | Indication information |
|---|---|---|
| | Key | Identifier of the first network device |
| | | Identifier of the first AS |
| Attribute | AS relation | Identifier of the first AS |
| | | Business role information |

Refer to Table 2. The table is a possible format of the BGP update message used for the external advertisement.

TABLE 2

| NLRI | Type | Indication information |
|---|---|---|
| | Key | Identifier of the second AS |
| Attribute | AS relation | Identifier of the first AS |
| | | Business role information |

For a format of the second message, refer to the format of the first message. Details are not described herein again.

In this embodiment of this application, the second network device may obtain the identifier of the first AS based on the first message, and determine the neighbor relationship between the first AS and the second AS, to perform route verification based on the neighbor relationship. The following describes a route verification method in detail. It should be noted that, in the message sending method and the message processing method provided in embodiments of this application, not only the second network device may perform route verification, but also the first network device, the third network device, and any network device in the network architecture that can receive a neighbor relationship between ASs may perform the route verification. The following uses FIG. 1 as an example for description.

Through the connection to the network device 111, the network device 121 may determine that the AS 2 is adjacent to the AS 1. Through the connection to the network device 131, the network device 121 may determine that the AS 2 is adjacent to the AS 3. After determining a neighbor relationship between the AS 2 and another AS, the network device 121 may send a BGP update message 1 to the network device 111. The BGP update message 1 includes the identifier of the AS 2 and identifiers of neighbor ASs of the AS 2. The identifiers of the neighbor ASs of the AS 2 include the identifier of the AS 1 and an identifier of the AS 3.

Similarly, the network device 131 may send a BGP update message 2 to the network device 111. The BGP update message 2 carries the identifier of the AS 3 and identifiers of neighbor ASs of the AS 3, and the identifiers of the neighbor ASs of the AS 2 include the identifier of the AS 1 and the identifier of the AS 2.

After receiving the BGP update message 1, the network device 111 may perform route verification based on the BGP update message 1, for example, determine a neighbor relationship between the AS 2 and the AS 3. After receiving the BGP update message 2 from the network device 131, the network device 111 determines whether the identifier of the neighbor AS of the AS 3 in the message includes the identifier of the AS 2. If the identifier of the neighbor AS of the AS 3 in the message includes the identifier of the AS 2, the neighbor relationship between AS 2 and AS 3 is correct. If the identifier of the neighbor AS of the AS 3 in the message does not include the identifier of the AS 2, the neighbor relationship between AS 2 and AS 3 is incorrect. The network device 111 may generate an alarm based on a determining result that the neighbor relationship between the AS 2 and the AS 3 is incorrect. Optionally, the network device 111 may send alarm information to a management device to generate the alarm. After obtaining the BGP update message, the network device 111 may obtain a corresponding neighbor relationship set of the AS. Further, an entire-network neighbor relationship set and a business relationship set may be obtained.

In some possible implementations, the route verification also includes verification on a business relationship. For example, the network device 121 may carry first business role information in the BGP update message 1, and the first business role information indicates a business relationship between the AS 2 and the AS 3. The network device 131 may carry second business role information in the BGP update message 2, and the second business role information indicates a business relationship between the AS 3 and the AS 2. The network device 121 may compare whether the first business role information matches the second business role information. If the first business role information does not match the second business role information, it indicates that at least one of the BGP update message 1 and the BGP update message 2 is tampered with by an attacker, and the network device 111 may generate the alarm.

An example is used for description. It is assumed that the first business role information is that the first AS is a customer relative to the second AS, and the second business role information is that the second AS is a provider relative to the first AS. In this way, the network device 111 may determine that the first business role information matches the second business role information, and generate no alarm. If the first business role information is that the first AS is a customer relative to the second AS, and the second business role information is that the second AS is a peer relative to the first AS, the network device 111 may determine that the first business role information does not match the second business role information, and generate the alarm.

It should be noted that, the foregoing embodiment describes the route verification based on the application scenario of the external advertisement, and does not indicate that route verification can be performed only in the application scenario of the external advertisement. For the application scenario of the internal advertisement, the network device may use a similar method to perform route verification, and details are not described herein again.

The foregoing describes the message sending method and the processing method provided in embodiments of this application. The following provides further descriptions with reference to FIG. 3.

Figure 3:
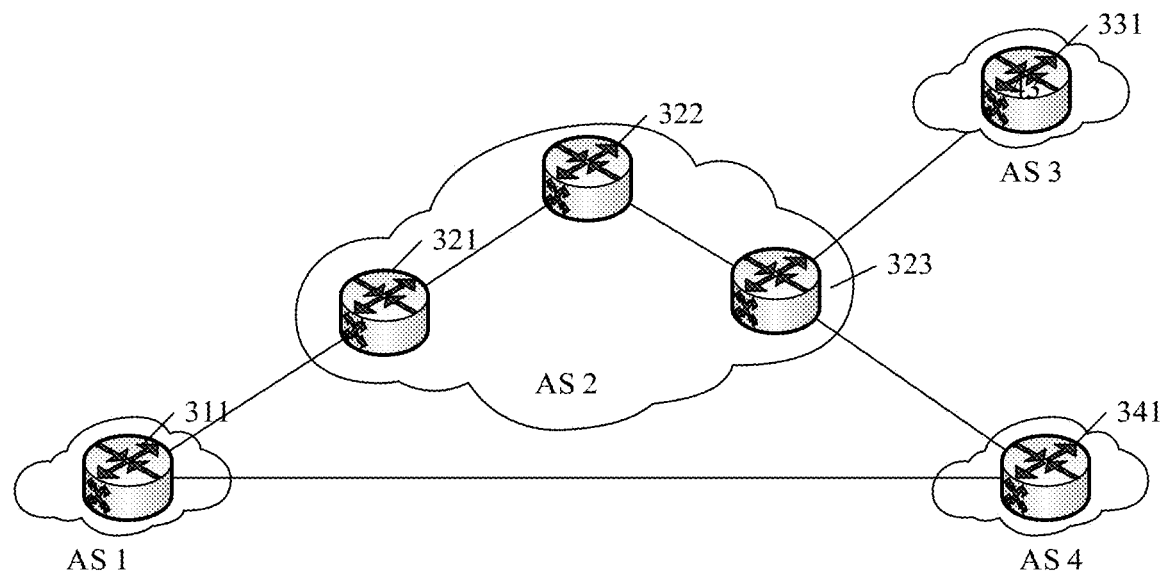
FIG. 3 is a schematic structural diagram of a BGP network architecture according to an embodiment of this application.

FIG. 3 is a schematic structural diagram of a BGP network architecture according to an embodiment of this application. The BGP network may include a network device 311, a network device 321, a network device 322, a network device 323, a network device 331, and a network device 341. The network device 321 is separately connected to the network device 311 and the network device 322, the network device 323 is separately connected to the network device 322, the network device 331 and the network device 341, and the network device 341 is connected to the network device 311. The network device 311 belongs to an AS 1, the network device 321, the network device 322, and the network device 323 belong to an AS 2, the network device 331 belongs to an AS 3, and the network device 341 belongs to an AS 4. In this embodiment of this application, the network device may be a router reflector (RR).

Through the connection to the network device 311, the network device 321 may obtain an AS identifier that corresponds to the network device 311 and that is of the AS 1, and determine that the AS 2 is adjacent to the AS 1. The network device 321 may generate a BGP update message 1 based on a neighbor relationship between the AS 2 and the AS 1, and send the BGP update message 1 to the network device 322. The BGP update message 1 includes the identifier of the AS 1, and notifies the network device 322 that the AS 1 is adjacent to the AS 2.

The BGP update message 1 may include an NLRI field and an attribute field, and the NLRI field includes a type field and a key field. The type field may carry indication information 1 to indicate that the BGP update message 1 is an internal advertisement message. The Key field and an AS relation field may carry the identifier of the AS 1. In addition, the key field may further include an identifier of the network device 321, for example, a router 321. The AS relation field may further include business role information of the AS 2, for example, a business relationship between the AS 1 and the AS 2. Optionally, a format of the BGP update message 1 may be shown in Table 3.

TABLE 3

| NLRI | Type | Indication information 1 |
|------|------|--------------------------|
|      | Key  | Router 321               |
|      |      | AS 1                     |
| Attribute | AS relation | AS 1 |
|      |      | Peer AS 2                |

After receiving the BGP update message 1, the network device 322 may determine, based on the indication information 1, that the BGP update message 1 is the internal advertisement message. The network device 322 may determine, based on the identifier of the AS 1, that the AS 1 is adjacent to the AS 2. Similarly, the network device 323 may determine that the AS 2 is adjacent to the AS 3 and that the AS 2 is adjacent to the AS 4, and send a BGP update message 2 and a BGP update message 3 to the network device 322. A key field of the BGP update message 2 includes an identifier AS 3 of the AS 3, and a key field of the BGP update message 3 includes an identifier AS 4 of the AS 4. In this way, the network device 322 may determine, based on the BGP update message 1, the BGP update message 2, and the BGP update message 3, that the AS 2 is separately adjacent to the AS 1, the AS 3, and the AS 4.

After determining a neighbor relationship between the AS 2 and another AS, the network device 322 may send a BGP update message 4 to the network device 321, and send a BGP update message 5 to the network device 323. The BGP update message 4 includes the identifier of the AS 3 and the identifier of the AS 4, so that the network device 321 learns a neighbor relationship between the AS 2 and the AS 3 and a neighbor relationship between the AS 2 and the AS 4. The BGP update message 5 includes the AS 1, so that the network device 323 learns the neighbor relationship between the AS 2 and the AS 1 and the neighbor relationship between the AS 2 and the AS 4.

The foregoing describes how the AS 2 advertises, inside the AS 2, a neighbor relationship between the AS 2 and another AS. The following describes how the AS 2 advertises, outside the AS 2, a neighbor relationship between the AS 2 and another AS.

After receiving the BGP update message 5, the network device 321 may send a BGP update message 6 to the network device 311. The BGP update message 6 includes an identifier of the AS 2 and identifiers of the AS 1, the AS 3, and the AS 4.

The BGP update message 6 may include an NLRI field and an attribute field. The NLRI field includes a type field and a key field, and the attribute field includes an AS relation field. The type field carries indication information 2 to indicate that the BGP update message 6 is an external advertisement message. The Key field carries the identifier of the AS 2, and the AS relation field carries the identifier of the AS 1, the identifier of the AS 3, and the identifier of the AS 4. Optionally, a format of the BGP update message 6 may be shown in Table 4.

TABLE 4

| NLRI | Type | Indication information 2 |
|------|------|--------------------------|

TABLE 4-continued

| Attribute | Key | AS 2 |
|---|---|---|
| | AS relation | AS 1 |
| | | AS 3 |
| | | AS 4 |

After receiving the BGP update message 6, the network device 311 may determine, based on the indication information 2, that the BGP update message 6 is the external advertisement message. Based on the identifier of the AS 2, the network device 311 may determine that the BGP update message 6 advertises a neighbor relationship between the AS 2 and another AS. Based on the identifiers of the AS 1, the AS 3, and the AS 4, the network device 311 may determine that the AS 2 is separately adjacent to the AS 1, the AS 3, and the AS 4.

Similarly, the network device 311 may further receive a BGP update message 7 sent by the network device 341. Optionally, a format of the BGP update message 7 is similar to that of the BGP update message 6. A key field of the BGP update message 7 carries the identifier of the AS 4, and an AS relation field of the BGP update message 7 carries the identifiers of the AS 1 and the AS 2. Based on the BGP update message 7, the network device 311 may determine that the AS 4 is separately adjacent to the AS 1 and the AS 2.

Optionally, the network device 321 may perform route verification on the BGP update message 7 based on the BGP update message 6. Because the BGP update message 6 carries a neighbor relationship between the AS 2 and the AS 4, the network device 321 may determine whether the AS relation field of the BGP update message 7 includes the identifier of the AS 2. If the AS relation field of the BGP update message 7 does not include the identifier of the AS 2, it indicates that the BGP update message 7 does not include the neighbor relationship between the AS 4 and the AS 2, and the network device 321 may generate an alarm.

Figure 4:
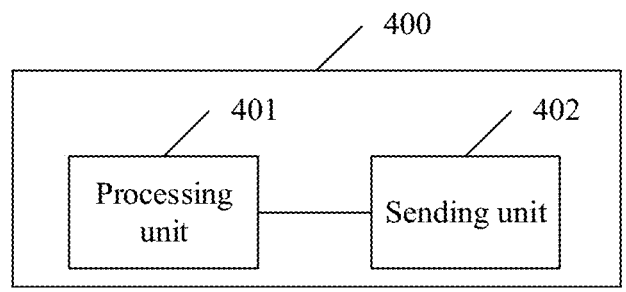
FIG. 4 is a schematic structural diagram of a message sending apparatus according to an embodiment of this application.

Correspondingly, refer to FIG. 4. An embodiment of this application further provides a message sending apparatus 400. The apparatus 400 is used in a network device. The network device may serve as a first network device to perform related steps of message sending in the embodiment shown in FIG. 2. The apparatus 400 includes a processing unit 401 and a sending unit 402. The processing unit 401 may be configured to perform the step S201 in the embodiment shown in FIG. 2, and the sending unit 402 may be configured to perform the step S202 in the embodiment shown in FIG. 2.

For example, the processing unit 401 is configured to obtain an identifier of a first AS, the first AS is adjacent to a second AS, and the first network device in which the processing unit 401 is located belongs to the second AS. The sending unit 402 is configured to send a first message to a second network device, the first message carries the identifier of the first AS, and the second network device belongs to the second AS or a third AS.

For other content of the message sending apparatus 400, refer to the foregoing descriptions. Details are not described herein again.

Figure 5:
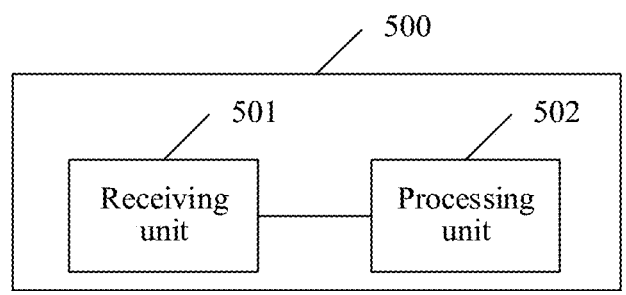
FIG. 5 is a schematic structural diagram of a message processing apparatus according to an embodiment of this application.

Refer to FIG. 5. An embodiment of this application further provides a message processing apparatus 500. The apparatus 500 is used in a network device. The network device may serve as a first network device to perform related steps of route verification in embodiments of this application. The apparatus 500 includes a receiving unit 501 and a processing unit 502. The receiving unit 501 may receive a neighbor relationship between a first AS and another AS, and the processing unit 502 may perform route verification based on the neighbor relationship between the first AS and the other AS.

For example, the receiving unit 501 is configured to receive a first message from a second network device, where the first message includes an identifier of the first autonomous system AS and an identifier of a neighbor AS of the first AS, and the neighbor AS of the first AS includes a second AS. The processing unit 502 is configured to perform route verification based on the first message.

For other content of the message processing apparatus 500, refer to the foregoing descriptions. Details are not described herein again.

It should be noted that, the message sending apparatus 400 and the message processing apparatus 500 may be located in a same network device, or may be located in different network devices.

Figure 6:
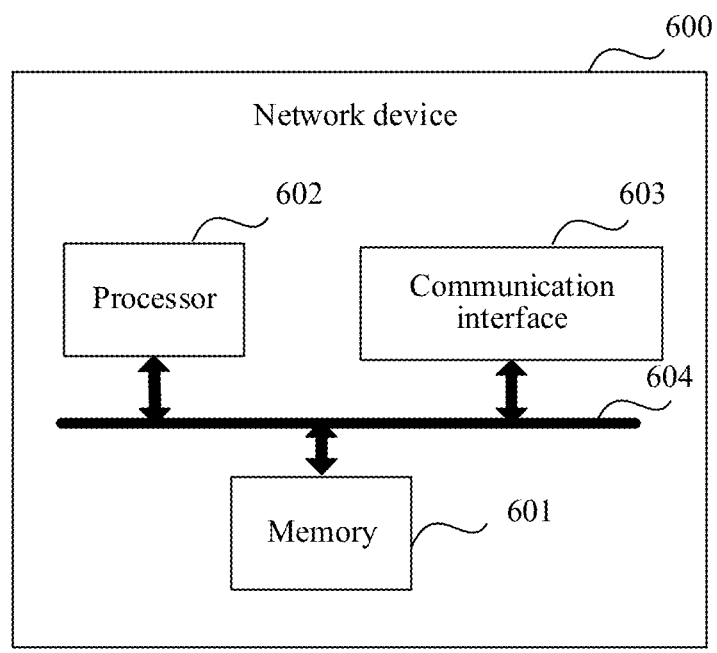
FIG. 6 is a schematic structural diagram of a network device according to an embodiment of this application.

Refer to FIG. 6. An embodiment of this application further provides a network device 600. The network device 600 includes at least one processor 602 and at least one communication interface 603. Further, the network device may include at least one memory 601, and the memory 601 is configured to store a computer program or instructions. The memory 601 may be a memory in the processor, or may be a memory outside the processor. A function of the apparatus 400 may be implemented on the network device 600. When the embodiment shown in FIG. 4 is implemented, and the units described in the embodiment of FIG. 4 are implemented by using software, software or program code required for performing functions of the processing unit 401 and the sending unit 402 in FIG. 4 is stored in the memory 601. A function of the apparatus 500 may be implemented on the network device 600. When the embodiment shown in FIG. 5 is implemented, and the units described in the embodiment of FIG. 5 are implemented by using software, software or program code required for performing functions of the receiving unit 501 and the processing unit 502 in FIG. 5 is stored in the memory 601. The processor 602 is configured to execute the instructions in the memory 601, so that the network device 600 performs any one or more of step S201 or step S202 in the embodiment shown in FIG. 2, or the network device 600 performs any step in the message processing method in the foregoing embodiment. The communication interface 603 is configured to communicate with another network device.

The memory 601, the processor 602, and the communication interface 603 are connected to each other through a bus 604. The bus 604 may be a Peripheral Component Interconnect (PCI) bus, an Extended Industry Standard Architecture (EISA) bus, or the like. The bus may be classified into an address bus, a data bus, a control bus, and the like. For ease of representation, only one thick line is used in FIG. 6 for representation, but it does not mean that there is only one bus or only one type of bus.

In a specific embodiment, the processor 602 may be configured to obtain an identifier of a first AS, where the first AS is adjacent to a second AS, and the network device 600 belongs to the second AS, and send a first message to a second network device, where the first message carries the identifier of the first AS, and the second network device belongs to the second AS or a third AS, and/or the processor 602 may be further configured to receive the first message from the second network device, where the first message includes the identifier of the first autonomous system AS and an identifier of a neighbor AS of the first AS, and the neighbor AS of the first AS includes the second AS, and perform route verification based on the first message. For a detailed processing process of the processor 602, refer to the embodiment shown in FIG. 3 and other detailed descriptions. Details are not described herein again.

The communication interface 603 is configured to interact with another network device. For a specific process, refer to the detailed descriptions of the foregoing embodiments. Details are not described herein again.

The memory 601 may be a random-access memory (RAM), a flash memory, a read-only memory (ROM), an erasable programmable ROM (EPROM), an electrically EPROM (EEPROM), a register, a hard disk, a removable hard disk, a compact-disc (CD) ROM (CD-ROM), or any other form of storage medium known to a person skilled in the art.

The processor 602 may be, for example, a central processing unit (CPU), a general-purpose processor, a digital signal processor (DSP), an application-specific integrated circuit (ASIC), a field-programmable gate array (FPGA) or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor.

The communication interface 603 may be, for example, an interface card, or may be an Ethernet interface or an asynchronous transfer mode (ATM) interface.

Figure 7:
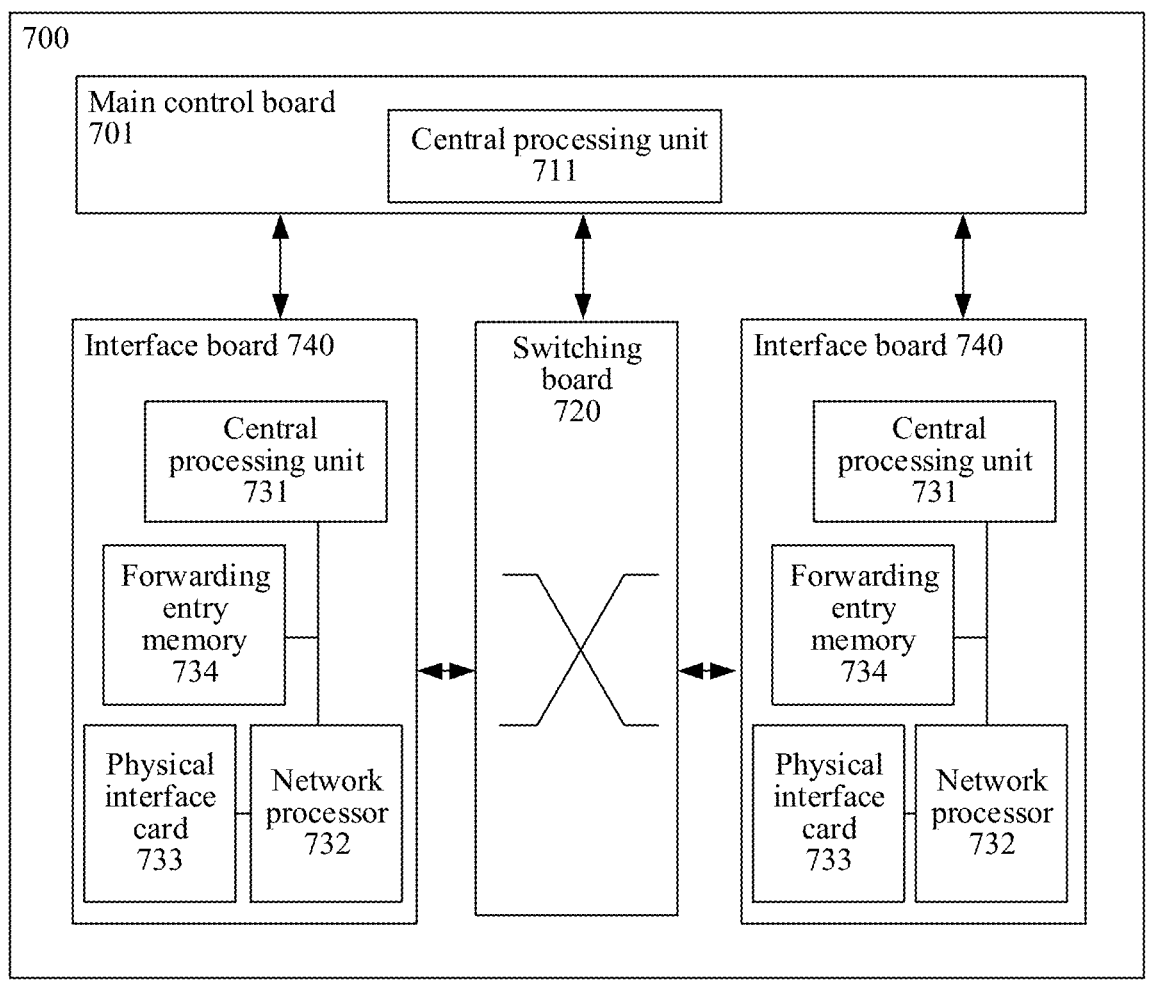
FIG. 7 is a schematic structural diagram of a network device according to an embodiment of this application.

FIG. 7 is a schematic structural diagram of a network device 700 according to an embodiment of this application. The network devices shown in the embodiment in FIG. 2 and other embodiments may be implemented by using the device shown in FIG. 7. Refer to the schematic structural diagram of the device shown in FIG. 7. The device 700 includes a main control board and one or more interface boards. The main control board and the interface boards are communicatively connected. The main control board is also referred to as a main processing unit (MPU) or a route processor card. The main control board is responsible for controlling and managing each component in the device 900, including route computation, device management, and function maintenance. The interface board is also referred to as a line processing unit (LPU) or a line card, and is configured to forward data. In some embodiments, the device 700 may also include a switching board. The switching board is communicatively connected to the main control board and the interface boards. The switching board is configured to forward data between the interface boards. The switching board may also be referred to as a switch fabric unit (SFU). The interface board includes a central processing unit, a memory, a forwarding chip, and a physical interface card (PIC). The central processing unit is communicatively connected to the memory, a network processor, and the physical interface card. The memory is configured to store a forwarding table. The forwarding chip is configured to forward a received data packet based on the forwarding table stored in the memory. If a destination address of the data packet is an address of the device 700, the data packet is sent to the CPU, for example, a central processing unit 731, for processing. If a destination address of the data packet is not an address of the device 700, a next hop and an outbound interface that correspond to the destination address are found in the forwarding table based on the destination address, and the data packet is forwarded to the outbound interface corresponding to the destination address. The forwarding chip may be a network processor (NP). The PIC, also referred to as a subcard, may be installed on the interface board. The PIC is responsible for converting an electro-optical signal to a data packet, checking validity of the data packet, and forwarding the data packet to the forwarding chip for processing. In some embodiments, the central processing unit may also perform a function of the forwarding chip, for example, implement software forwarding based on a general-purpose CPU, so that the interface board does not need the forwarding chip. The main control board, the interface board, and the switching board may communicate to each other through a bus. In some embodiments, the forwarding chip may be implemented by using an ASIC or an FPGA.

Logically, the device 700 includes a control plane and a forwarding plane. The control plane includes the main control board and the central processing unit. The forwarding plane includes components for performing forwarding, such as the memory, the PIC, and the NP. The control plane performs functions such as a function of a router, generating a forwarding table, processing signaling and a protocol packet, and configuring and maintaining a status of a device. The control plane delivers the generated forwarding table to the forwarding plane. On the forwarding plane, the NP searches the forwarding table based on the forwarding table delivered by the control plane, to forward a packet received by the PIC of the device 700. The forwarding table delivered by the control plane may be stored in the memory. In some embodiments, the control plane and the forwarding plane may be completely separated, and are not on a same device. The foregoing process is briefly described below with reference to the embodiment shown in FIG. 2 and other embodiments.

As shown in the method shown in FIG. 7, the CPU 731 of the network device 700 may obtain an identifier of a first AS. For example, the CPU 731 receives the identifier of the first AS sent by a physical interface card 733 based on a second message that includes the identifier of the first AS, generates a first message that includes the identifier of the first AS, and sends the first message to a second network device. Alternatively, the network device 700 may receive a first message by using a physical interface card 733, and send the first message to the CPU 731 for processing. The first message includes an identifier of a first AS and an identifier of a neighbor AS of the first AS. The CPU 731 may perform route verification based on the first message.

The network device provided in this embodiment of the present disclosure may correspond to the first network device in the method embodiment in FIG. 2 or other method embodiments, and may implement functions of the network device and/or various steps and methods implemented by the network device in the foregoing method embodiments. The foregoing is merely a brief example description. For brevity, details are not described herein.

It should be noted that, there may be one or more main control boards. When there is a plurality of main control boards, the main control boards may include an active main control board and a standby main control board. There may be one or more interface boards. A network device having a stronger data processing capability provides more interface boards. There may also be one or more physical interface cards on the interface board. There may be no switching board or one or more switching boards. When there is a plurality of switching boards, load balancing and redundancy backup may be implemented together. In a centralized forwarding architecture, the network device may not need the switching board, and the interface board provides a function of processing service data of an entire system. In a distributed forwarding architecture, the network device may have at least one switching board, and data exchange between a plurality of interface boards is implemented via the switching board, to provide large-capacity data exchange and processing capabilities. Therefore, data access and processing capabilities of a network device in the distributed architecture are better than those of a device in the centralized architecture. Optionally, the network device may alternatively be in a form in which there is only one card. To be specific, there is no switching board, and functions of the interface board and the main control board are integrated on the card. In this case, the central processing unit on the interface board and a central processing unit on the main control board may be combined into one central processing unit on the card, to perform functions obtained by combining the two central processing units. The device in this form (for example, a network device such as a low-end switch or router) has weak data exchange and processing capabilities. A specific architecture that is to be used depends on a specific networking deployment scenario. This is not limited herein.

In addition, an embodiment of this application further provides a computer-readable storage medium, including a computer program. When the computer program is run on a computer, the computer is enabled to perform the message sending method or the message processing method applied to the network device 700.

An embodiment of this application further provides a chip system, including a processor, where the processor is coupled to a memory. The memory is configured to store a program or instructions. When the program or the instructions are executed by the processor, the chip system is enabled to implement the method according to any one of the foregoing method embodiments.

Optionally, there may be one or more processors in the chip system. The processor may be implemented by hardware, or may be implemented by software. When the processor is implemented by hardware, the processor may be a logic circuit, an integrated circuit, or the like. When the processor is implemented by software, the processor may be a general-purpose processor, and is implemented by reading software code stored in the memory.

Optionally, there may also be one or more memories in the chip system. The memory may be integrated with the processor, or may be disposed separately from the processor. This is not limited in this application. For example, the memory may be a non-transitory processor, for example, a ROM. The memory and the processor may be integrated into a same chip, or may be separately disposed on different chips. A type of the memory and a manner of disposing the memory and the processor are not further limited in this application.

For example, the chip system may be an FPGA, an ASIC, a system on a chip (SoC), a CPU, an NP, a digital signal processing circuit (DSP), a microcontroller unit (MCU), a programmable logic device (PLD), or another integrated chip.

It should be understood that the steps in the foregoing method embodiments may be completed by using a hardware integrated logic circuit in the processor or instructions in a form of software. The steps in the methods disclosed with reference to embodiments of this application may be directly performed and completed by a hardware processor, or may be performed and completed by using a combination of hardware in the processor and a software module.

In the specification, claims, and accompanying drawings of this application, the terms "first", "second", "third", "fourth", and the like (if existent) are intended to distinguish between similar objects but do not necessarily indicate a specific order or sequence. It should be understood that the data termed in such a way are interchangeable in proper circumstances so that embodiments described herein can be implemented in other orders than the order illustrated or described herein. In addition, the terms "include" and "have" and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

In this application, "at least one item (piece)" means one or more, and "a plurality of" means two or more. "At least one of the following items (pieces)" or a similar expression thereof means any combination of these items, including any combination of singular items (pieces) or plural items (pieces). For example, at least one item (piece) of a, b, or c may represent: a, b, c, a and b, a and c, b and c, or a, b, and c, where a, b, and c may be singular or plural. In this application, it is considered that "A and/or B" includes only A, only B, and both A and B.

It may be clearly understood by a person skilled in the art that, for the purpose of convenient and brief description, for detailed working processes of the foregoing system, apparatus, and unit, refer to a corresponding process in the foregoing method embodiment. Details are not described herein again.

In the several embodiments provided in this application, it should be understood that the disclosed system, apparatus, and method may be implemented in other manners. For example, the described apparatus embodiments are merely examples. For example, division into the units is merely logical module division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be obtained based on actual requirements to achieve the objectives of the solutions of embodiments.

In addition, module units in embodiments of this application may be integrated into one processing unit, or each of the units may exist alone physically, or two or more units are integrated into one unit. The integrated unit may be implemented in a form of hardware, or may be implemented in a form of a software module unit.

When the integrated unit is implemented in the form of a software module unit and sold or used as an independent product, the integrated unit may be stored in a computer-readable storage medium. Based on such an understanding, the technical solutions of this application essentially, or the part contributing to a conventional technology, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in embodiments of this application. The storage medium includes any medium that can store program code, such as a Universal Serial Bus (USB) flash drive, a removable hard disk, a ROM, a RAM, a magnetic disk, or an optical disc.

A person skilled in the art should be aware that in the foregoing one or more examples, functions described in the present disclosure may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer storage medium and a communication medium, where the communication medium includes any medium that enables a computer program to be transmitted from one place to another. The storage medium may be any available medium that can be accessed by a general-purpose or a dedicated computer.

In the foregoing specific implementations, the objectives, technical solutions, and beneficial effects of the present disclosure are further described in detail. It should be understood that the foregoing descriptions are merely specific implementations of the present disclosure.

In conclusion, the foregoing embodiments are merely intended for describing the technical solutions of this application, but not for limiting this application. Although this application is described in detail with reference to the foregoing embodiments, a person of ordinary skill in the art can understand that modifications may still be made to the technical solutions described in the foregoing embodiments or equivalent replacements may still be made to some technical features thereof, without departing from the scope of the technical solutions of embodiments of this application.

What is claimed is:

1. A first network device comprising:
   one or more memories configured to store instructions; and
   one or more processors coupled to the one or more memories and configured to execute the instructions to cause the first network device to:
   obtain a first identifier of a first autonomous system (AS) and business role information that reflects a business relationship between the first AS and a second AS, wherein the business relationship indicates that the first AS is a customer relative to the second AS, wherein the first AS is adjacent to the second AS, and wherein the first network device belongs to the second AS; and
   send, to a second network device of the second AS or a third AS, a first message carrying the first identifier and the business role information to enable the second network device to perform route verification based on a comparison of the business role information with a second business role information, wherein the second business role information comprises a second business relationship indicating the second AS is a provider relative to the first AS.

2. The first network device of claim 1, wherein the one or more processors are further configured to execute the instructions to cause the first network device to receive, from a third network device, a second message comprising the first identifier, and wherein the third network device belongs to the first AS or the second AS.

3. The first network device of claim 1, wherein the one or more processors are further configured to execute the instructions to cause the first network device to further obtain, based on a neighbor relationship, the first identifier, and wherein the neighbor relationship indicates an adjacent relationship between the first AS and the second AS.

4. The first network device of claim 1, wherein the first message is a Border Gateway Protocol (BGP) update message.

5. The first network device of claim 4, wherein the business role information is carried in an attribute field of the BGP update message.

6. The first network device of claim 4, wherein the first identifier is carried in a network layer reachability information (NLRI) field of the BGP update message or an attribute field of the BGP update message.

7. The first network device of claim 6, wherein the NLRI field comprises indication information, and wherein the indication information indicates that the BGP update message comprises the first identifier.

8. The first network device of claim 1, wherein the first message further comprises a second identifier of the first network device.

9. The first network device of claim 8, wherein the first message is a Border Gateway Protocol (BGP) update message, and wherein the second identifier is carried in a network layer reachability information (NLRI) field of the BGP update message.

10. The first network device of claim 1, wherein the second network device belongs to the third AS, and wherein the first message further comprises a second identifier of the second AS.

11. The first network device of claim 1, wherein the first message enables the second network device to perform route verification based on the first identifier.

12. The first network device of claim 1, wherein the first network device is in an Internet Protocol (IP)-based network.

13. A network system comprising:
   a first network device configured to:
   obtain an identifier of a first autonomous system (AS) and first business role information that reflects a business relationship between the first AS and a second AS, wherein the business relationship indicates that the first AS is a customer relative to the second AS, wherein the first AS is adjacent to the second AS, and wherein the first network device belongs to the second AS; and
   send a message carrying the identifier; and
   a second network device configured to:
   receive, from the first network device, the message, wherein the second network device belongs to the second AS or a third AS; and
   perform route verification based on a comparison of the first business role information with a second business role information, wherein the second business role information comprises a second business relationship indicating the second AS is a provider relative to the first AS.

14. The network system of claim 13, wherein the first network device is further configured to further obtain, based on a neighbor relationship, the identifier, and wherein the neighbor relationship indicates an adjacent relationship between the first AS and the second AS.

15. The network system of claim 13, wherein the first network device is further configured to receive, from a third network device, a second message comprising the first identifier, and wherein the third network device belongs to the first AS or the second AS.

16. A network system comprising:
a first network device configured to:
receive a first message comprising a first identifier of a first autonomous system (AS), a second identifier of a first neighbor AS of the first AS, and first business role information reflecting a first business relationship between the first AS and the first neighbor AS, wherein the first business relationship indicates that the first AS is a customer relative to the second AS based on a first customer-provider relationship, and wherein the first neighbor AS comprises a second AS;
receive, from a third network device, a second message comprising a third identifier of a second neighbor AS of the second AS and second business role information reflecting a second business relationship between the second neighbor AS and the second AS, wherein the second business relationship indicates that the second AS is a provider relative to the first AS in a second customer-provider relationship, and wherein the second neighbor AS comprises the first AS;
compare, based on the first business relationship and the second business relationship, the first customer-provider relationship with the second customer-provider relationship to identify a match; and
perform route verification based on a comparison of the first business role information with the second business role information.

17. The network system of claim 16, further comprising a second network device coupled to the first network device and configured to send, to the first network device, the first message.

18. The network system of claim 16, wherein the first network device is further configured to:
identify that the third identifier does not comprise the first identifier; and
generate, in response to identifying that the third identifier does not comprise the first identifier, an alarm.

19. The network system of claim 16, wherein the first network device is further configured to:
identify that the first business role information does not match the second business role information; and
generate, in response to identifying that the first business role information does not match the second business role information, an alarm.

20. The network system of claim 16, wherein the first identifier is carried in a network layer reachability information (NLRI) field of a Border Gateway Protocol (BGP) update message or an attribute field of the BGP update message.

* * * * *